US010348142B2

(12) United States Patent
Fippl et al.

(10) Patent No.: US 10,348,142 B2
(45) Date of Patent: Jul. 9, 2019

(54) STATOR OF AN ELECTRIC MACHINE AND SLOT LINER CAGE FOR A STATOR

(71) Applicant: VOLKSWAGEN AKTIENGESELLSCHAFT, Wolfsburg (DE)

(72) Inventors: Mike Fippl, Baunatal (DE); Uwe Riemenschneider, Edermuende (DE); Michael Schnier, Edermuende (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 150 days.

(21) Appl. No.: 15/451,453

(22) Filed: Mar. 7, 2017

(65) Prior Publication Data
US 2017/0256998 A1 Sep. 7, 2017

(30) Foreign Application Priority Data

Mar. 7, 2016 (DE) .................. 10 2016 203 664

(51) Int. Cl.
*H02K 1/18* (2006.01)
*H02K 1/16* (2006.01)
*H02K 3/487* (2006.01)

(52) U.S. Cl.
CPC ............. *H02K 1/185* (2013.01); *H02K 1/165* (2013.01); *H02K 3/487* (2013.01)

(58) Field of Classification Search
CPC ......... H02K 1/165; H02K 1/185; H02K 3/487
USPC .................................................. 310/215, 43
See application file for complete search history.

(56) References Cited

U.S. PATENT DOCUMENTS

| 2,701,316 | A | | 2/1955 | Willits et al. | |
| 4,264,835 | A | | 4/1981 | Viewegh et al. | |
| 5,821,652 | A | * | 10/1998 | Hyypio | H02K 11/01 310/83 |
| 5,979,087 | A | * | 11/1999 | Bell | H02K 11/01 310/196 |
| 7,015,396 | B2 | | 3/2006 | Wada et al. | |
| 7,242,125 | B2 | | 7/2007 | Schneider et al. | |
| 7,944,110 | B2 | | 5/2011 | Tanaka et al. | |
| 2004/0046476 | A1 | * | 3/2004 | Becherucci | H02K 3/522 310/207 |

(Continued)

FOREIGN PATENT DOCUMENTS

CN 205017137 U 2/2016
DE 102004015243 B4 3/2008

(Continued)

*Primary Examiner* — Alex W Mok
(74) *Attorney, Agent, or Firm* — Laurence A. Greenberg; Werner H. Stemer; Ralph E. Locher

(57) ABSTRACT

A stator of an electric machine has an annular stator body with a multiplicity of winding slots. The winding slots protrude into the stator body in the manner of a pocket from a ring interior. Respective windings are disposed in the winding slots and the slots are sealed toward the ring interior with slot-liner elements. The slot-liner elements of all the winding slots are combined to form a slot-liner cage. The slot-liner cage is formed with circumferential cage rings at the ends of the slot-liner elements. The cage rings have an interruption at a circumferential point. The circumferential point has a self-retaining lock geometry which prevents an autonomous opening of two intermeshing ring ends of the cage rings.

12 Claims, 3 Drawing Sheets

(56) References Cited

U.S. PATENT DOCUMENTS

| | | | |
|---|---|---|---|
| 2004/0145267 A1* | 7/2004 | Lowry | H02K 3/487 310/215 |
| 2007/0194653 A1* | 8/2007 | Prokscha | H02K 3/522 310/216.023 |
| 2008/0309173 A1 | 12/2008 | Makino | |
| 2009/0079292 A1* | 3/2009 | Horiba | H02K 3/34 310/215 |
| 2014/0042862 A1 | 2/2014 | Ishigami et al. | |
| 2015/0028716 A1* | 1/2015 | Zook | H02K 3/345 310/215 |
| 2015/0214803 A1 | 7/2015 | Zhang et al. | |
| 2017/0040858 A1 | 2/2017 | Darras et al. | |

FOREIGN PATENT DOCUMENTS

| | | |
|---|---|---|
| EP | 1617543 A2 | 1/2006 |
| EP | 2031734 A2 | 3/2009 |
| FR | 2166212 A1 | 8/1973 |
| GB | 1389460 A | 4/1975 |
| GB | 2509738 A | 7/2014 |
| JP | 2000134846 A | 5/2000 |
| KR | 20000027449 A | 5/2000 |
| WO | 2015158996 A2 | 10/2015 |

\* cited by examiner

STATOR OF AN ELECTRIC MACHINE AND SLOT LINER CAGE FOR A STATOR

CROSS-REFERENCE TO RELATED APPLICATION

This application claims the priority, under 35 U.S.C. § 119, of German patent application DE 10 2016 203 664.5, filed Mar. 7, 2016; the prior application is herewith incorporated by reference in its entirety.

BACKGROUND OF THE INVENTION

Field of the Invention

The present invention relates to a stator of an electric machine, with an annular stator body in which a multiplicity of winding slots have been introduced. The winding slots protrude into the stator body in the manner of a pocket from the interior of a ring. In the winding slots respective windings have been introduced which have respectively been sealed toward the interior of the ring with a slot-liner element. The slot-liner elements of all the winding slots have been combined to form a slot-liner cage. The slot-liner cage has circumferential cage rings at the ends of the slot-liner elements.

German patent DE 10 2004 015 243 B4 discloses a stator of an electric machine with an annular stator body in which a large number of winding slots have been introduced, and in the winding slots there are seated windings which have been introduced from the interior of the ring into the winding slots designed in the manner of a pocket. The interior of the ring exhibits the shape of a hollow cylinder in which, for the purpose of forming the electric machine, a rotor is introduced and is accommodated, supported so as to be capable of rotating via bearing devices which have been connected to the stator. In order to seal the winding slots inward toward the interior of the ring, use is made of so-called slot-liner elements which in the present state of the art have been formed from individual slot-liner elements that are inserted into the orifice region of the pocket-type winding slots toward the interior of the ring. In this case the mounting of the slot-liner elements is disadvantageously elaborate, and by reason of spatial circumstances, in particular with respect to the winding protruding axially beyond the stator, the orifice regions of the pocket-type winding slots extending into the interior of the ring are difficult to access.

A slot-liner cage is known from published patent application US 2004/0145267 A1. The multiplicity of individual slot-liner elements have been prepositioned in their arrangement via two cage rings, so that the slot-liner cage merely has to be inserted into the stator body from the interior of the ring, and the individual slot-liner elements get into the orifice regions of the pocket-type winding slots in order to seal the windings. Inserting the slot-liner cage in this case again turns out to be difficult, by reason of the accessibility of the orifice regions of the winding slots toward the interior of the ring, particularly if the slot-liner cage has been constructed to be dimensionally stable and the windings protrude laterally beyond the stator body.

SUMMARY OF THE INVENTION

It is accordingly an object of the invention to provide a stator of an electric machine which overcomes the above-mentioned and other disadvantages of the heretofore-known devices and methods of this general type and which provides for an improved arrangement of slot-liner elements. In particular, a slot-liner cage is to be improved, the cage being easier to arrange on the stator body.

With the foregoing and other objects in view there is provided, in accordance with the invention, a stator of an electric machine, the stator comprising:

an annular stator body formed with a multiplicity of winding slots, the winding slots protruding into the stator body from a ring interior to form respective pockets;

respective windings disposed within the winding slots;

a slot-liner cage formed with slot-liner elements sealing the winding slots toward the ring interior, the slot-liner cage having circumferential cage rings at ends of the slot-liner elements;

the cage rings being interrupted at a circumferential point, the circumferential point being formed with a self-retaining lock geometry that prevents an autonomous opening of two intermeshing ring ends of the cage rings.

In other words, the invention includes the technical teaching that the cage rings have been interrupted at a circumferential point. The circumferential point is provided with a self-retaining lock geometry which prevents an autonomous opening of two intermeshing ring ends of the cage rings.

The central concept of the invention is the possibility to interrupt the slot-liner cage in the ring shape for the mounting onto the stator body, and the slot-liner cage, uncoiled or broken open, forms a rectangular strip with slot-liner elements running parallel to one another and with marginal uncoiled cage rings. By virtue of a, in particular, dimensionally unstable configuration of the slot-liner cage, for the purpose of fitting into the interior of the ring of the stator body the diameter can be reduced by an opening of the cage rings, and the slot-liner elements, prepositioned by the cage rings, can be pressed into the individual winding slots from the interior of the ring. Lastly, the interruptions at the circumferential points of the cage rings are sealed, so that the slot-liner cage is capable of being mounted in straightforward manner and can remain in the mounted arrangement. By reason of the lock geometry, an automatic opening of the circumferential point is prevented, so that the ring ends cannot come apart autonomously. The function of the slot-liner cage is therefore fulfilled in full scope, and an opening of the lock geometry is additionally prevented, in particular, by a subsequent impregnation, since as a result of this the ends of the ring stick to one another.

A particular advantage is achieved with the lock geometry if the lock geometry has been designed with a positive closure in the radial direction of the slot-liner cage. The radial direction in this case relates to the annular stator body, so that by virtue of the positive closure the situation has been prevented where at least one ring end is able to drift automatically inward or outward in the radial direction or in the tangential direction.

In accordance with an added feature of the invention, the lock geometry includes an indentation at a first ring end and a bulge at a second ring end. The bulge is seated in the indentation for the purpose of forming the positive closure. With the interaction between the indentation and the bulge, the principle of a spring/groove connection is created which forms a positive closure in the lateral direction at right angles to the circumferential direction of progression of the cage rings. In this connection the bulge and the indentation have been designed in such a way that by an application of force they are able to snap into one another without an axial introduction of the bulge into the indentation being necessary. A securing of the bulge which is seated in the indentation is improved by virtue of the fact that the slot-liner cage is seated in the stator body under tangential initial tension from the interior of the ring, so that the bulge is pressed into the indentation.

With several indentations and bulges over the width of the cage ring, a lock geometry with an S-shaped dividing line between the two ring ends can be created which prevents a snapping-open of the slot-liner ring in every direction—that is to say, radially inward, radially outward or in the tangential direction.

According to a more extensive variant, it is also conceivable that several lock geometries, distributed over the circumference, have been introduced within the cage rings, so that the slot-liner cage can be assembled from several segments, by virtue of which an alleviated mounting results, where appropriate.

In accordance with an additional feature of the invention, an improved slot-liner cage is obtained if projections have been formed on the cage rings between the slot-liner elements, the projections being able to rest on a lateral face of the stator body when the slot-liner cage has been mounted on the stator body. The projections protrude, alternately with the slot-liner elements, from the cage rings in the direction toward the respectively opposing cage ring, said projections alternating with the slot-liner elements. In this case the projections have been designed to be so short that the top side of the projections on the first cage ring and the top side of the projections on the second cage ring form the clear, free dimension which corresponds to the axial length of the stator body from lateral face to lateral face.

As a result, the holding arrangement of the slot-liner cage on the stator body is further improved.

In order to simplify the mounting of the slot-liner cage further, the projections may also exhibit insertion bevels, so that the projections can be pushed better onto the lateral face of the stator body.

A further improvement of the stator provides that the slot-liner elements have been designed to be tapering and/or wedge-shaped in the direction pointing radially outward, so that in the direction toward the winding the taper or the wedge shape protrudes into the winding slot. As a result, the pressing of the slot-liner elements into the orifice region of the winding slots from the interior of the ring of the stator body is alleviated. A particular simplification for producing the slot-liner cage is obtained if the latter is formed from a one-piece injection-molded component.

With the above and other objects in view there is also provided, in accordance with the invention, a slot-liner cage for placement on a stator, the slot-line cage comprising:

two cage rings and a multiplicity of slot-liner elements extending parallel to one another between the two cage rings;

the cage rings being interrupted at a circumferential point formed by ring ends, the circumferential point being formed with a self-retaining lock geometry configured to prevents an autonomous opening of the two intermeshing ring ends of the cage rings.

In accordance with a concomitant and particularly advantageous feature of the invention, the lock geometry includes an indentation at a first ring end and a bulge at a second ring end, the bulge being seated in the indentation for the purpose of forming a positive closure. The further features and associated advantages described in connection with the stator are also given consideration for the slot-liner cage.

Other features which are considered as characteristic for the invention are set forth in the appended claims.

Although the invention is illustrated and described herein as embodied in a stator of an electric machine, and a slot liner for such a stator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
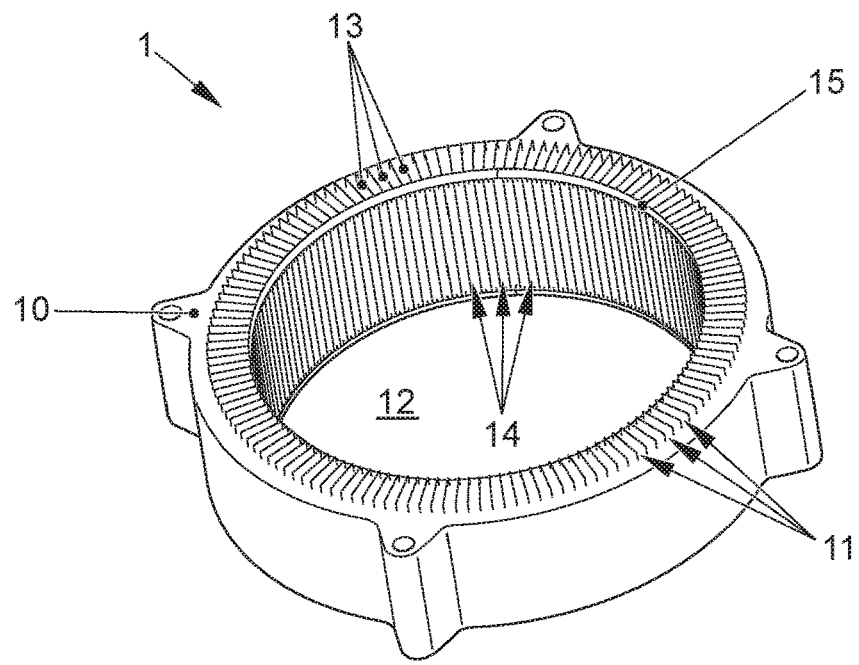
FIG. 1 shows a perspective view of a stator with a stator body and with a slot-liner cage introduced from the interior of the ring of the stator body.

Referring now to the figures of the drawing in detail and first, particularly, to FIG. 1 thereof, there is shown a stator 1 for an electric machine. The stator 1 comprises, as an essential constituent part, an annular stator body 10, the ring shape describing the basic structure of the stator body 10. A ring interior 12 is formed within the annular stator body 10. Winding slots 11 extend radially outward from the ring interior 12 into the stator body 10. Windings 13 are seated in the winding slots 11. A rotor can be arranged within the ring interior 12 for the purpose of forming the electric machine, and, given an appropriately driven supply of current to the windings 13, the rotor will execute a rotary motion within the ring interior 12. The ring interior 12 forms substantially the shell shape of a cylinder and exhibits an axial direction which reproduces a width direction of the stator body 10, and the winding slots 11 protrude outward into the stator body 10 from the inside in a radial direction.

A slot-liner cage 15 is shown which is introduced into the stator body 10 from the ring interior 12. The slot-liner cage 15 comprises a multiplicity (i.e., a large number) of slot-liner elements 14 which are seated in the orifice regions of the winding slots 11. By virtue of the slot-liner elements 14, the winding slots 11 are substantially sealed in the direction toward the ring interior 12, so that the windings 13 have been encapsulated in the winding slots 11.

Figure 2:
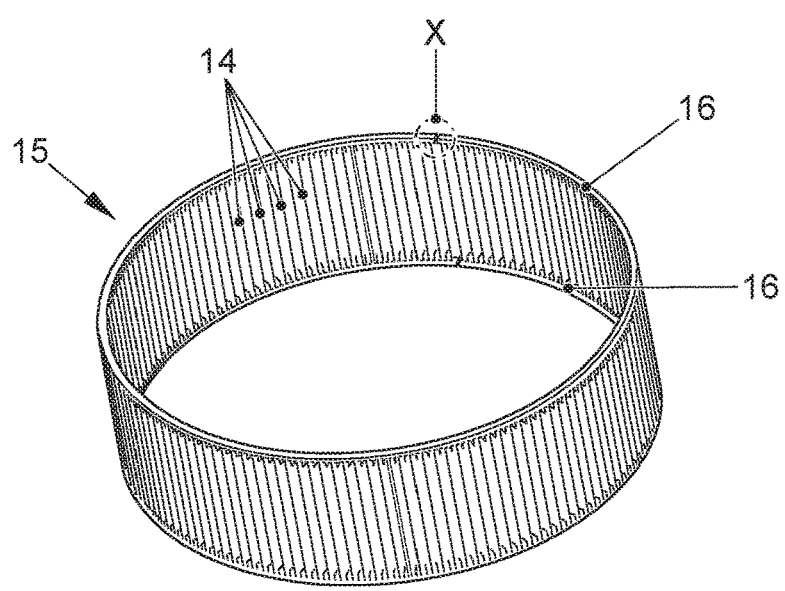
FIG. 2 a perspective view of a slot-liner cage with a circumferential point X.

FIG. 2 shows, in a perspective view, a slot-liner cage 15 with a large number of slot-liner elements 14 which extend in the axial direction and have been accommodated, arranged parallel to one another, between two circumferential cage rings 16. The cage rings 16 have a circumferential point X at which the cage rings 16 according to the present invention exhibit an interruption.

Figure 3:
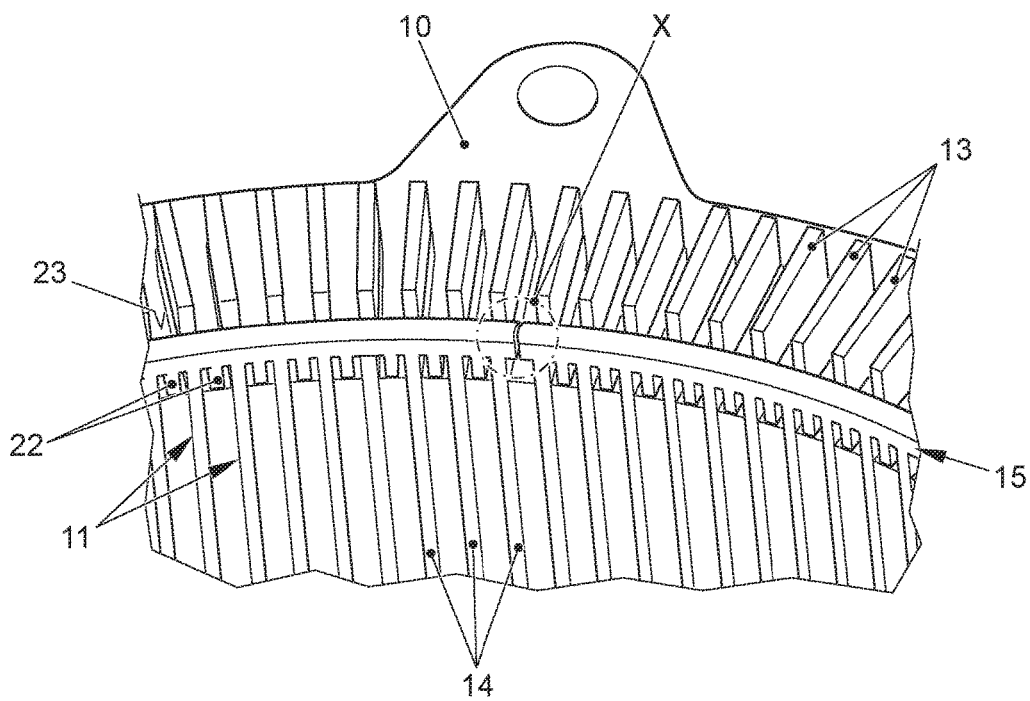
FIG. 3 shows a detail view of the arrangement of the slot-liner cage on the stator body.

FIG. 3 shows, in a detail view, the slot-liner cage 15 with the interruption X, and the slot-liner cage 15 with the slot-liner elements 14 is shown inserted within the stator body 10. Represented moreover, by way of a portion, are the windings 13, and the winding slots 11 substantially accommodate the slot-liner elements 14, so that the slot-liner elements 14 are seated in the anterior regions of the winding slots 11. The slot-liner cage 15 exhibits, moreover, projections 22 which rest on a lateral face of the stator body 10, as described in more detailed manner in connection with FIG. 7.

Figure 4:
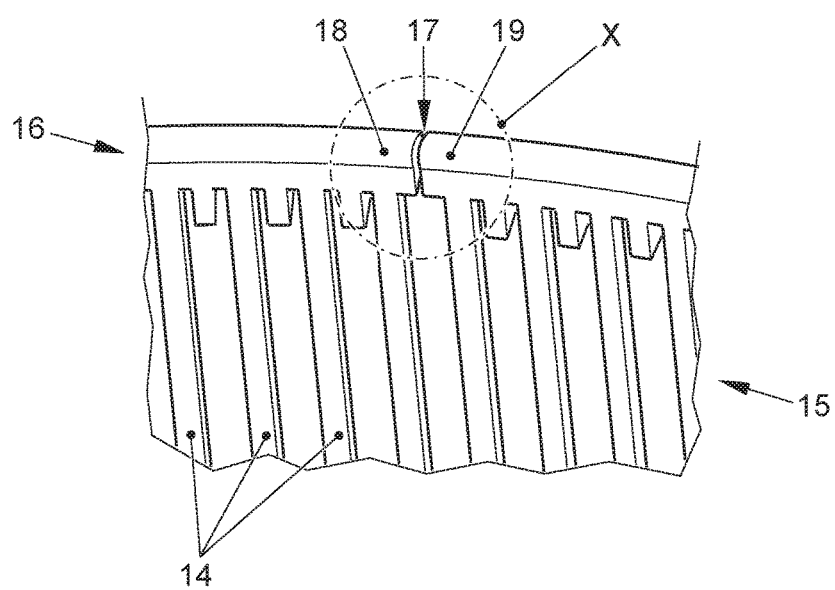
FIG. 4 shows a detail view of the circumferential point X of the slot-liner cage.

FIG. 4 shows a view, by way of a detail, of the slot-liner cage 15 with the slot-liner elements 14 and with one of two cage rings 16. The cage ring 16 is illustrated in the region of the circumferential point X. The interruption at the circumferential point X forms in the cage ring 16 a first ring end 18 and an opposing second ring end 19, and the ring ends 18 and 19 intermesh in such a way that a self-retaining lock geometry 17 results, as described in more detail in connection with the following FIG. 5.

Figure 5:
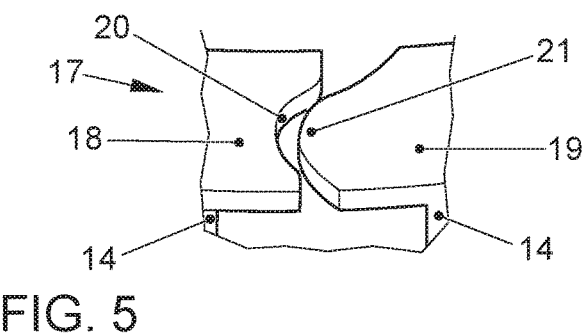
FIG. 5 shows a detail view of the cage ring in the region of a circumferential point with two ring ends.

FIG. 5 shows a detail view of the lock geometry 17 between the two intermeshing ring ends 18 and 19. The lock geometry 17 exhibits an indentation 20 at the first ring end 18, and at the second ring end 19 the lock geometry 17 exhibits a bulge 21, and for the purpose of forming a positive closure the bulge 21 is seated in the indentation 20. The slot-liner elements 14 extend underneath the ring ends 18 and 19, and the lock geometry 17 has been introduced at a point that is located between two slot-liner elements 14.

Figure 6:
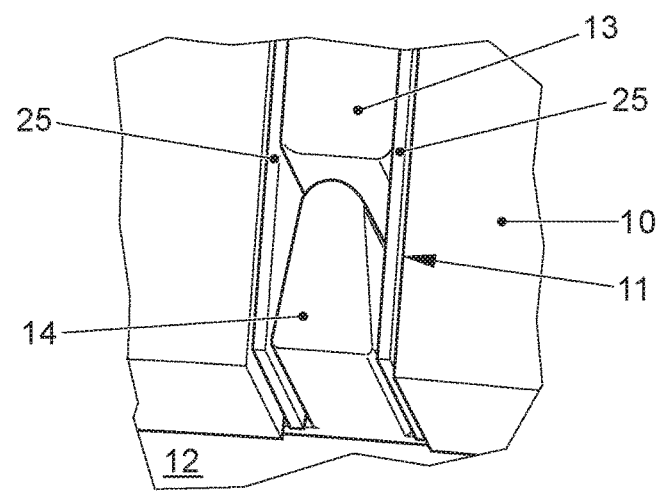
FIG. 6 shows a cross-sectional view of a slot-liner element which is seated in a winding slot.

FIG. 6 shows a sectional view through the stator body 10 in the region of a winding slot 11 in which a winding 13 has been introduced. Toward the ring interior 12 the winding slot 11 has been sealed with a slot-liner element 14 which exhibits an approximately wedge-like shape tapering into the winding slot 11. Laterally the winding slot 11 has been lined with an insulating body 25, for instance an electrically non-conducting film or an electrically non-conducting insulating paper.

Figure 7:
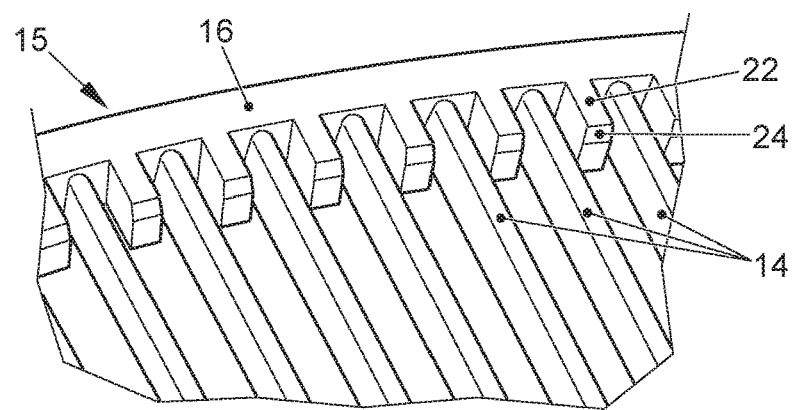
FIG. 7 shows a detail view of the slot-liner cage in the region of a cage ring.

Lastly, FIG. 7 shows a perspective view of a detail of the slot-liner cage 15 in the region of a radially circumferential cage ring 16 from which several slot-liner elements 14 are adjacent in the axial direction. Projections 22 have been formed between the slot-liner elements 14 and arranged on the cage ring 16 in the interior, said projections being able to rest on a lateral face 23 of the stator body 10, as represented with the projections 22 of the slot-liner cage 15 in FIG. 3. The projections 22 include insertion bevels 24, in order to mount the slot-liner cage 15 in straightforward manner within the ring interior 12. The slot-liner cage 15 has a diameter from 200 mm to 220 mm, for instance, and the axial height of the cage rings 16 amounts to 2.5 mm to 3.5 mm, for instance, and preferably 2.8 mm. The height of the cage ring 16, including the projections 22, amounts to 6 mm, for instance. The slot-liner elements 14 exhibit a width of 1.6 mm, for instance, the width having been measured on the base-width side via which the taper or the wedge shape extends. While the stator is illustrated herein with approximately 140 winding slots, it will be readily understood that any other number of the multiplicity of the slots may be provided.

With the further development according to the invention of the slot-liner cage 15, and with the interruption on the two cage rings 16, a simple possibility for mounting the slot-liner cage 15 is made possible. Firstly, the slot-liner cage 15 with interrupted ring ends 18, 19 is made available, so that the slot-liner cage 15, for instance in an uncoiled form, can be fitted into the ring interior 12 of the stator body 10. Subsequently the individual slot-liner elements 14 are inserted into the orifice regions of the winding slots 11, and the projections 22 on the cage rings 16 between the slot-liner elements 14 position the slot-liner cage 15 in the axial direction. Once all the slot-liner elements 14 have been inserted into the winding slots 11, the lock geometry 17 can be closed, by the bulge 21 being pressed into the indentation 20 from a radial direction. By a simple snapping of the bulge 21 into the indentation 20, the positive closure in the radial direction is obtained, so that an automatic opening of the ring ends 18, 19 of the cage rings 16 has been prohibited.

The invention is not restricted in its implementation to the preferred embodiment specified above. Rather, a number of variants are conceivable that make use of the presented solution also in fundamentally differently fashioned implementations. All the features and/or advantages emerging from the claims, from the description or from the drawings—inclusive of structural particulars, spatial arrangements and process steps—may be essential for the invention, both by themselves and in the most diverse combinations.

The following is a summary list of reference numerals and the corresponding structure used in the above description of the invention:

1 stator
10 stator body
11 winding slot
12 ring interior
13 winding
14 slot-liner element
15 slot-liner cage
16 cage ring
17 lock geometry
18 ring end
19 ring end
20 indentation
21 bulge
22 projection
23 lateral face
24 insertion bevel
25 insulating body
X circumferential point

The invention claimed is:

1. A stator of an electric machine, the stator comprising:
an annular stator body formed with a multiplicity of winding slots, said winding slots protruding into said stator body from a ring interior to form respective pockets;
respective windings disposed within said winding slots;
a slot-liner cage formed with slot-liner elements sealing said winding slots toward the ring interior, said slot-liner cage having circumferential cage rings at ends of said slot-liner elements, wherein a gap is formed between each of said slot-liner elements;
each of said cage rings being interrupted at a single circumferential point, said circumferential point being formed with a self-retaining lock geometry that prevents an autonomous opening of two intermeshing ring ends of said cage rings, said lock geometry formed axially adjacent one of the gaps.

2. The stator according to claim 1, wherein said lock geometry comprises a positive closure disposed to act in a radial direction of said slot-liner cage.

3. The stator according to claim 1, wherein said lock geometry comprises an indentation at a first ring end and a bulge at a second ring end, and wherein said bulge is seated in said indentation for forming said positive closure.

4. The stator according to claim 3, wherein said slot-liner cage is seated in said stator body under tangential initial tension from the ring interior, so that said bulge is pressed into said indentation.

5. The stator according to claim 1, wherein said cage rings are formed with projections between said slot-liner elements, said projections resting on a lateral face of said stator body.

6. The stator according to claim 5, wherein said projections are formed with an insertion bevel.

7. The stator according to claim 1, wherein said slot-liner elements are formed with a taper and/or with a wedge shape pointing in a direction radially outward, so that said taper or wedge shape projects into said winding slot in a direction toward a respective said winding.

8. The stator according to claim 1, wherein said slot-liner cage is a one-piece injection-molded component.

9. A slot-liner cage for placement on a stator, the slot-line cage comprising:

two cage rings and a multiplicity of slot-liner elements extending parallel to one another between said two cage rings, wherein a gap is formed between each of said slot-liner elements;

each of said cage rings being interrupted at a single circumferential point formed by ring ends, said circumferential point being formed with a self-retaining lock geometry configured to prevents an autonomous opening of said two intermeshing ring ends of said cage rings, said lock geometry formed axially adjacent one of the gaps.

10. The slot-liner cage according to claim 9, wherein said lock geometry is formed with an indentation at a first said ring end and a bulge at a second said ring end, said bulge being seated in said indentation for forming a positive closure.

11. The slot-liner cage according to claim 9, wherein said lock geometry comprises a positive closure disposed to act in a radial direction of said slot-liner cage.

12. The slot-liner cage according to claim 9, wherein said lock geometry comprises an indentation at a first ring end and a bulge at a second ring end, and wherein said bulge is seated in said indentation for forming said positive closure.

* * * * *